US005656559A

United States Patent [19]
Combes et al.

[11] Patent Number: 5,656,559
[45] Date of Patent: Aug. 12, 1997

[54] CLEAR GLASS COMPOSITION INTENDED FOR THE PRODUCTION OF PANES

[75] Inventors: Jean-Marie Combes, Paris; Dominique Sachot, Joinville Le Pont, both of France

[73] Assignee: Saint-Gobain Vitrage, Courbevoie, France

[21] Appl. No.: 494,000

[22] Filed: Jun. 23, 1995

[30] Foreign Application Priority Data

Jun. 23, 1994 [FR] France ................................. 94 07725

[51] Int. Cl.$^6$ ........................... C03C 3/087; C03C 3/089; C03C 3/091
[52] U.S. Cl. .......................... 501/70; 501/65; 501/66; 501/71
[58] Field of Search ........................ 501/65, 66, 70, 501/71

[56] References Cited

U.S. PATENT DOCUMENTS

| Re. 25,312 | 1/1963 | Duncan et al. | 501/71 |
|---|---|---|---|
| 3,723,142 | 3/1973 | Kato et al. | 501/71 |
| 4,104,076 | 8/1978 | Pons | 501/66 |
| 4,190,452 | 2/1980 | Fischer et al. | 501/66 |
| 4,792,536 | 12/1988 | Pecoraro et al. | 501/70 |
| 5,023,210 | 6/1991 | Kromwiede et al. | 501/71 |
| 5,030,593 | 7/1991 | Heithoff | 501/70 |
| 5,030,594 | 7/1991 | Heithoff | 501/70 |
| 5,264,400 | 11/1993 | Nakaguchi et al. | 501/70 |
| 5,278,108 | 1/1994 | Cheng et al. | 501/71 |
| 5,346,867 | 9/1994 | Jones et al. | 501/70 |
| 5,352,640 | 10/1994 | Combes et al. | 501/71 |
| 5,362,689 | 11/1994 | Morimoto et al. | 501/70 |
| 5,364,820 | 11/1994 | Morimoto et al. | 501/71 |
| 5,380,685 | 1/1995 | Morimoto et al. | 501/71 |
| 5,478,783 | 12/1995 | Higby et al. | 501/71 |
| 5,523,263 | 6/1996 | Penrod | 501/27 |

FOREIGN PATENT DOCUMENTS

| 0413254 | 2/1991 | European Pat. Off. . |
|---|---|---|
| 2672587 | 8/1992 | France . |
| 52102310 | 8/1977 | Japan . |
| 1470679 | 4/1989 | U.S.S.R. . |
| 1565815 | 5/1990 | U.S.S.R. . |
| 1744067 | 6/1992 | U.S.S.R. . |
| 1168769 | 10/1969 | United Kingdom . |
| 2252973 | 8/1992 | United Kingdom . |

OTHER PUBLICATIONS

M. B. Volf, "Chemical Approach to Glass" Elsevier 1984, p. 274.
Database WPI, Derwent Publications, AN–85–307908, JP–60–215546, Oct. 28, 1985.
Sprechsaal, vol. 126, No. 5, 1993, pp. 292–297, J.P. Stevenson, "Minor Additions of B2O3 To Container Glass Formulations."

Primary Examiner—Mark L. Bell
Assistant Examiner—Louis M. Troilo
Attorney, Agent, or Firm—Oblon, Spivak, McClelland, Maier & Neustadt, P.C.

[57] ABSTRACT

A composition for soda-lime-silica glass intended for the production of panes, which comprises, in percentages by weight:

| | |
|---|---|
| $SiO_2$ | 69 to 75% |
| $Al_2O_3$ | 0 to 3% |
| $B_2O_3$ | 0.5% |
| CaO | 2 to 10% |
| MgO | < to 2% |
| $Na_2O$ | 9 to 17% |
| $K_2O$ | 0 to 8% |
| Se | 0 to 0.002% |
| CoO | 0 to 0.001% |
| $Cr_2O_3$ | 0 to 0.001% |
| with 0.02% < $Fe_2O_3$ (total) < 0.2%. | |

This composition may further comprise fluorine, oxides of zinc and zirconium and less than 4% of barium oxide, the total of the percentages of the alkaline earth oxides remaining equal to or less than 10%. The panes made from such glasses are particularly well adapted for architectural applications.

14 Claims, No Drawings

CLEAR GLASS COMPOSITION INTENDED FOR THE PRODUCTION OF PANES

BACKGROUND OF THE INVENTION

1. Field of the Invention

This invention relates to a composition of soda-lime-silica glass suitable for the production of panes that may be used in the architectural field or the automobile industry. The composition according to the invention is especially adapted for production in the form of a continuous glass ribbon by the float glass technique.

2. Discussion of the Background

Compositions of soda-lime-silica glass used in this technique have been characterized by very slight variations from an average glass. The following composition, expressed in percentages by weight, is very representative:

| | |
|---|---|
| $SiO_2$ | 73.08 |
| $Al_2O_3$ | 0.11 |
| CaO | 8.94 |
| MgO | 3.88 |
| $Na_2O$ | 13.68 |
| $K_2O$ | 0.02 |
| $Fe_2O_3$ | 0.12 |
| $SO_3$ | 0.23 |

This glass, which is notably characterized by a low content of iron oxides, enables glass sheets to be produced with a particularly high total light transmission factor under illuminant A ($TL_A$). This characteristic is desirable for panes intended to be mounted on automobile vehicles or to be installed in buildings.

Iron, traditionally expressed as $Fe_2O_3$, is distributed through the glass in the form of ferric oxide and ferrous oxide, the respective concentrations of which depend upon the degree of oxidation/reduction of the glass. The presence of ferric oxide enables the absorption of ultraviolet radiation and those radiations that have short wavelengths in the visible range of the spectrum. The presence of ferrous oxide makes possible the absorption of the radiations in the near infrared and those corresponding to the long wavelengths of the visible range. The latter phenomenon of absorption has the effect of reducing the total energy transmission factor ($T_g$). These iron oxides, in particular FeO, contribute to the coloration of the glass.

A pane made from a glass of the type mentioned above has, for a large thickness, a non-negligible coloration in spite of the low content of iron oxides.

SUMMARY OF THE INVENTION

The present invention is a soda-lime-silica glass composition which enables panes to be produced that have a lower coloration than that of the known glasses and a better absorption of the infrared radiation, even with the same iron content in the form of FeO and the same thickness.

The glass of the present invention has a composition with a grey or bronze coloration, and a high light transmission factor under illuminant A.

These objectives are achieved by a soda-lime-silica glass composition which contains, expressed in percentages by weight, the following limits, including all values therebetween:

| | |
|---|---|
| $SiO_2$ | 69 to 75% |
| $Al_2O_3$ | 0 to 3% |
| $B_2O_3$ | 0 to 5% |
| CaO | 2 to 10% |
| MgO | <2% |
| $Na_2O$ | 9 to 17% |
| $K_2O$ | 0 to 8% |
| Se | 0 to 0.002% |
| CoO | 0 to 0.001% |
| $Cr_2O_3$ | 0 to 0.001% | with $0.02\% < Fe_2O_3$ (total) $< 0.2\%$

This composition may further contain fluorine, oxides of zinc and zirconium, and less than 4% barium oxide. The sum of the percentages of the alkaline-earth oxides is equal to or less than 10%. The content and nature of each of the constituents forming part of the composition of the glasses of this invention enables glasses to be obtained which have a displacement of the maximum of the FeO absorption band towards the longer wavelengths. The glasses of the invention also have the properties required for the production of panes from sheets, which have been cut from a ribbon of float glass.

Silica is kept within relatively narrow limits. With a silica content above approximately 75%, the viscosity of the glass and its aptitude for devitrification greatly increases, making it more difficult to melt and cast onto a tin bath. With a silica content below 69%, the hydrolytic resistance of the glass decreases very rapidly, and the transmission in the visible range also decreases.

A decrease in the hydrolytic resistance of the glass can be compensated, at least partly, by the introduction of $Al_2O_3$. However, this oxide contributes to an increase in viscosity and to a decrease in the transmission in the visible range; it can therefore be used only in a very limited quantity.

The alkaline oxides $Na_2O$ and $K_2O$ facilitate the melting of the glass, and allow the viscosity at high temperatures to be maintained closer to that of a standard glass. $K_2O$ can be used up to approximately 8%. Above this percentage, the increase in cost of the composition becomes an economic handicap. Moreover, the increase of the percentage of $K_2O$ can only be carried out, basically, at the expense of $Na_2O$, contributing to the increase in viscosity. Under specific conditions, however, the presence of $K_2O$ enables the absorption of the glass in the infrared to be increased. The sum of the percentages by weight of $Na_2O$ and $K_2O$ is, preferably, greater than 15%.

The alkaline-earth oxides fulfill an important role in achieving the properties of the glasses of the present invention. It has been found that limiting the MgO content to a percentage less than 2% and, preferably, less than 1%, or indeed eliminating it altogether, has the effect of displacing the FeO absorption band towards the longer wavelengths. The total elimination of MgO, which exerts an important influence upon the viscosity, may be partly compensated for by increasing the content of $Na_2O$. Thus, when the MgO content is zero, the sum of the contents by weight of $Na_2O$ and $K_2O$ is preferably greater than 15%. MgO may be present in very small amounts, such as 0.1% or even 0.01%, by weight.

CaO should be limited to 10%. Above this value, the tendency of the glass towards devitrification increases too rapidly.

BaO, which enables the light transmission to be increased, can be added to the inventive compositions in an amount lower than 4%. In fact, BaO has a much smaller influence than MgO and CaO upon the viscosity of the glass. Within the framework of the invention, the increase in BaO is made essentially at the expense of the alkaline oxides, MgO and especially CaO. Any large increase in BaO therefore contributes to increasing the viscosity of the glass, especially at low temperatures. Furthermore, the introduction of a high percentage of BaO substantially raises the cost of the composition and has a tendency to lower the hydrolytic resistance of the glass. When the glasses of this invention contain barium oxide, the percentages of this oxide is, preferably, between 0.5 and 3.5% by weight, including all values therebetween.

Apart from complying with the limits defined above for the variation in the content of each alkaline-earth oxide, in order to obtain the desired transmission properties, it is important to limit the sum of the percentages of MgO, CaO and BaO to a value equal to or less than 10%. It should be noted that for reasons of an essentially economic nature the glasses according to this invention do not require any strontium oxide.

The glasses according to the invention may also contain fluorine, preferably from 0.5 to 2% by weight, including all values therebetween. Apart from its well known action upon the melting and viscosity of the glass, fluorine has a specific influence upon the absorption of infrared radiation, an effect that is additive to the effect produced by the elimination of MgO and the introduction of $K_2O$ and BaO. This effect manifests itself by a slight displacement of the maximum of the FeO absorption band in the infrared, but in particular by the straightening of the slope of the band at the end of the visible range near the infrared.

The glasses according to the invention may also contain zinc oxide. This oxide enables the viscosity of the glass to be reduced, if necessary, and contributes to an increase in the hydrolytic resistance of the glass and a reduction in its tendency to devitrify. This is why ZnO is preferably introduced into the inventive glasses containing a high percentage of silica and/or not containing alumina. Zinc oxide may also advantageously be added to the vitrifiable mixture which will be used for producing a reduced glass. This oxide enables the appearance of an amber color to be prevented, which would result from the formation of iron sulphides in this type of glass. Thus, zinc oxide can be introduced into the glasses according to the invention in a proportion of at least 0.05% when the $FeO/Fe_2O_3$ (total) ratio is equal to or greater than approximately 0.4. In order not to increase excessively the expense of the composition, the ZnO content does not usually exceed approximately 3% by weight.

The glasses according to the invention may also contain zirconium oxide. This oxide enables the glass to be stabilized and the chemical resistance of the glass, in particular, its hydrolytic resistance, to be improved. This oxide is introduced preferably into the inventive glasses containing little or no alumina, in quantities that can reach 1.5% by weight.

The glasses according to the invention may also contain up to 1% of other constituents provided by the impurities in the vitrifiable raw materials and/or as a result of the introduction of culler into the vitrifiable mixture and/or arising from the use of a refining agent ($SO_3$, Cl, $Sb_2O_3$, $As_2O_3$).

The glasses according to the invention that have a bronze coloration generally contain selenium and cobalt. They are characterized by dominant wavelengths, under illuminant C, exceeding approximately 565 nm. It is possible for the composition to contain 0.0001% cobalt, and/or 0.0001% Se, by weight.

The glasses to this invention that have a gray shade generally contain selenium and also cobalt oxide and chromium oxides. They are characterized by dominant wavelengths, under illuminant C, of less than approximately 560 nm.

The glasses according to this invention may be produced in conditions that enable the desired oxidation/reduction degree to be achieved. Thus the glasses according to the invention may be produced by using known refining agents, such as sulphates, their redox being less than 0.35 and generally between 0.2 and 0.3. This is the case for the glasses which contain selenium. They can also be produced in conditions described, for example, by the Patent EP-B-297 404 and may have a redox greater than 0.4 or 0.15; the redox of the glasses according to the invention always remains, however, below 0.8.

The content and the nature of each of the constituents forming part of the composition of the inventive glasses, principally the alkaline-earth oxide, enable glasses to be obtained with the near infrared modified by a displacement towards the longer wavelengths of the maximum of the FeO absorption band in this spectral range. The displacement is frequently accompanied by an increase in the intensity of this absorption band and/or of its width. The displacement has the effect of not only increasing the absorption in the infrared of the inventive glasses, but also of lessening the coloration caused by FeO. This phenomenon thus allows glasses of lesser coloration to be produced for a given thickness, than for the common glasses having identical iron content; glasses which have a comparable quality of vitrifiable raw materials. It is now possible to produce glasses having the same coloration as conventional glasses for a given thickness, but with a higher iron content, possibly made from less pure vitrifiable raw materials. As a result of this phenomenon a non-negligible absorption of the infrared radiations and a weak coloration of the glass are obtained when the total iron content of the glasses according to the invention, expressed in the form $Fe_2O_3$, is greater than approximately 0.04% by weight.

The glasses according to this invention are characterized by a total light transmission factor greater than 80% for a thickness of 3.85 millimeters and have a ratio $TL_A/T_E$ equal to or greater than 1.

The glasses according to the invention have an excitation purity under illuminant C (Pc) less than 2% for a thickness of 3.85 millimeters. For the grey glasses according to this invention, this purity is lower than 1.5% for the same thickness and lower than 1% for the thickness of 3.15 millimeters.

DETAILED DESCRIPTION OF THE PREFERRED EMBODIMENTS

The advantages of the glasses according to the invention will be better perceived from the reference examples described below, which are given for illustration of the invention and are not intended to be limiting thereof. The two compositions of glass below are expressed in percentages by weight. Glass 1 is representative of the glasses of a known type, notably with regard to the MgO content. Glass 2 illustrates the invention. The total light transmission factor under illuminant A ($TL_A$) and total energy transmission factor ($T_E$), and also the transmission in the infrared ($T_{IR}$) were measured by the PARRY MOON MASS 2 method, for a thickness of 3.85 millimeters. The two glasses have an identical content of FeO, equal to 0.028%.

| | | |
|---|---|---|
| SiO$_2$ | 71.10 | 73.50 |
| Al$_2$O$_3$ | 0.70 | 0.90 |
| CaO | 8.80 | 9.00 |
| MgO | 4.00 | — |
| Na$_2$O | 14.30 | 15.80 |
| K$_2$O | 0.22 | 0.29 |
| Fe$_2$O$_3$ | 0.10 | 0.10 |
| SO$_3$ | 0.30 | 0.30 |
| $\lambda^{FeO}$ (nm) | 1020 | 1110 |
| $\delta^{FeO}$ (nm) | 180 | 450 |
| TL$_A$ (%) | 89.20 | 89.90 |
| TL$_A$/T$_E$ | 1.03 | 1.05 |
| T$_{IR}$ | 81.80 | 80.50 |
| Pc (%) | 0.25 | 0.30 |
| $\lambda_D$ (nm) | 518 | 541 |

The displacement of approximately 90 nanometers of the wavelength ($\lambda_{FeO}$) corresponding to the maximum of the absorption band due to FeO of the glass illustrating this invention, as compared with the known glass, is accompanied by a considerable broadening of the band. The amount of this broadening an be appreciated by the difference ($\delta_{FeO}$) existing between the two wavelengths, which corresponds to the transmission values higher, by 0.5%, than the minimum transmission. Apart from the influence upon the coloration of the glass, this spectral modification causes a slight increase in the absorption in the infrared of the inventive glasses for an identical FeO content and in spite of the small content of the oxide.

The glasses according to this invention are compatible with the usual manufacturing techniques for float glass. The thickness of the ribbon of glass obtained by pouring molten glass onto a bath of tin can vary from 0.8 to 10 millimeters. The pane obtained by cutting from the glass ribbon may later be subjected to a bending operation, notably when it is to be mounted on an automobile vehicle.

In the manner of other panes, the panes obtained from the glasses according to this invention may be subjected in advance to surface treatments or may be associated, for example, with an organic coating such as a film based upon polyurethanes having antilaceration properties, or a film assuring leaktightness in case of breakage; it may also be coated locally with a coating such as an enamel coating.

The glasses according to this invention may be coated with at least one film of metallic oxide produced by chemical deposition at high temperature according to the pyrolysis techniques or by chemical deposition in the vapor phase (CVD) or deposition under vacuum.

Obviously, numerous modifications and variations of the present invention are possible in light of the above teachings. It is therefore to be understood that within the scope of the appended claims, the invention may be practiced otherwise as is specifically described herein.

What is claimed as new and is desired to be secured by Letters Patent of the United States is:

1. A composition for soda-lime-silica glass comprising, in percentages by weight:

| | |
|---|---|
| SiO$_2$ | 69 to 75% |
| CaO | 2 to 10% |
| Na$_2$O | 9 to 17% |
| BaO | 0 to 3.5% |
| with 0.02% < Fe$_2$O$_3$ (total) < 0.2% | | wherein the sum of the percentages of alkaline-earth oxides is equal to or less than 10%, the MgO content is less than 1%, and wherein said glass has, for a thickness of 3.85 millimeters, a factor TL$_A$ equal to at least 80%.

2. The glass composition according to claim 1, wherein the sum of alkaline oxides is greater than approximately 15%, by weight.

3. The glass composition according to claim 1, comprising 0.5 to 3.5% by weight of BaO.

4. The glass composition according to claim 1, further comprising 0.5 to 2% by weight of fluorine.

5. The glass composition according to claim 1, further comprising 0.05 to 3% by weight of ZnO.

6. The glass composition according to claim 1, further comprising no more than 1.5% by weight of ZrO$_2$.

7. The glass composition according to claim 1, further comprising no more than 3% by weight of Al$_2$O$_3$.

8. The glass composition according to claim 1, further comprising no more than 5% by weight of B$_2$O$_3$.

9. The glass composition according to claim 1, further comprising no more than 8% by weight of K$_2$O.

10. The glass composition according to claim 1, further comprising no more than 0.002% by weight of Se.

11. The glass composition according to claim 1, further comprising no more than 0.001% by weight of CoO.

12. The glass composition according to claim 1, further comprising no more than 0.001% by weight of Cr$_2$O$_3$.

13. The glass composition according to claim 1, wherein the amount of MgO is zero.

14. A pane, comprising at least one sheet of glass, said glass comprising, in percentages by weight:

| | |
|---|---|
| SiO$_2$ | 69 to 75% |
| CaO | 2 to 10% |
| Na$_2$O | 9 to 17% |
| BaO | 0 to 3.5% |
| with 0.02% < Fe$_2$O$_3$ (total) < 0.2% | | wherein the sum of the percentages of alkaline-earth oxides is equal to or less than 10%, the MgO content is less than 1%, wherein said glass has, for a thickness of 3.85 millimeters, a factor TL$_A$ equal to at least 80% and wherein the sheet of glass has a thickness of 0.8 to 10 mm.

* * * * *